(12) United States Patent
Nachenberg et al.

(10) Patent No.: US 9,959,404 B2
(45) Date of Patent: May 1, 2018

(54) METHODS AND SYSTEMS FOR CREATING AND UPDATING APPROVED-FILE AND TRUSTED-DOMAIN DATABASES

(75) Inventors: Carey Nachenberg, Manhattan Beach, CA (US); Michael Spertus, Wilmette, IL (US); Sourabh Satish, Fremont, CA (US); Gerry Egan, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 825 days.

(21) Appl. No.: 11/865,073

(22) Filed: Oct. 1, 2007

(65) Prior Publication Data

US 2009/0089290 A1    Apr. 2, 2009

(51) Int. Cl.
*G06F 21/51* (2013.01)
*G06F 21/56* (2013.01)
*H04L 29/06* (2006.01)

(52) U.S. Cl.
CPC .............. *G06F 21/51* (2013.01); *G06F 21/56* (2013.01); *H04L 63/1416* (2013.01)

(58) Field of Classification Search
CPC ....... G06F 17/30861; G06F 2221/2119; G06F 21/00; G06F 21/31; G06F 21/56
USPC .......... 726/12, 28, 24, 26, 29; 709/219, 245, 709/203; 707/E17.014
See application file for complete search history.

(56) References Cited

U.S. PATENT DOCUMENTS

| 6,321,267 | B1 * | 11/2001 | Donaldson | H04L 51/12 370/351 |
| 7,010,655 | B1 * | 3/2006 | Harmer et al. | 711/163 |
| 8,316,446 | B1 * | 11/2012 | Campbell et al. | 726/24 |
| 2001/0049732 | A1 * | 12/2001 | Raciborski et al. | 709/224 |
| 2002/0010740 | A1 * | 1/2002 | Kikuchi | H04L 29/06027 709/203 |

(Continued)

FOREIGN PATENT DOCUMENTS

| CN | 200810161944.1 | 10/2008 |
| EP | 08165345.3 | 9/2008 |

(Continued)

OTHER PUBLICATIONS

European Office Action; EP Application No. 08165345.3; dated Jul. 6, 2011.

(Continued)

*Primary Examiner* — Amanda L Willis
(74) *Attorney, Agent, or Firm* — FisherBroyles, LLP

(57) ABSTRACT

Computer-implemented methods and systems for creating or updating approved-file and trusted-domain databases and verifying the legitimacy of files are disclosed. A method for creating or updating an approved-file database may include intercepting a first file, identifying a source domain associated with the first file, identifying a trusted-domain database, determining whether a database record for the source domain associated with the first file exists within the trusted-domain database, creating a hash value for the first file if a database record for the source domain associated with the first file exists within the trusted-domain database, and storing the hash value for the first file in an approved-file database. Methods and systems for verifying the legitimacy of a file and for creating or updating a trusted-domain database are also disclosed.

20 Claims, 10 Drawing Sheets

(56) References Cited

U.S. PATENT DOCUMENTS

| | | | |
|---|---|---|---|
| 2004/0044622 A1* | 3/2004 | Blott et al. ...................... | 705/40 |
| 2005/0213763 A1* | 9/2005 | Owen et al. ................... | 380/270 |
| 2006/0150256 A1* | 7/2006 | Fanton .................... | G06F 21/10 |
| | | | 726/27 |
| 2006/0230452 A1* | 10/2006 | Field .............................. | 726/22 |
| 2008/0229101 A1* | 9/2008 | Thomas ........................ | 713/168 |

FOREIGN PATENT DOCUMENTS

| | | |
|---|---|---|
| JP | 2008256860 | 10/2008 |
| WO | 2007096659 A1 | 8/2007 |

OTHER PUBLICATIONS

EP Search Report; EP Application No. 08165345.3; dated Oct. 7, 2011.

* cited by examiner

METHODS AND SYSTEMS FOR CREATING AND UPDATING APPROVED-FILE AND TRUSTED-DOMAIN DATABASES

BACKGROUND

Existing anti-virus technologies are becoming increasingly ineffective at protecting computing resources from malicious files and programs, such as viruses and other types of malware, leading to the investigation of alternate technologies. One promising area of development is in file "whitelisting," a system in which only applications, files, or programs contained within a defined list of items may be accessed or executed by a computing system, while all other files or programs are prevented from running on the computing system.

Conventional whitelist systems rely on either manually-created whitelists or web-spidering (often referred to as web-crawling) techniques to identify legitimate (or potentially legitimate) files. However, given the velocity of new applications created and published (oftentimes via the Internet) on a daily basis, it is practically impossible to manually create a comprehensive whitelist of legitimate files.

Moreover, conventional web-spidering techniques typically only identify a portion of known legitimate files, estimated as low as 10%, due to various limitations in web-spidering technology. For example, web-spidering techniques have difficulty accessing and analyzing files that are only accessible after a user fills out an online form and/or purchases the file via an electronic transaction. Conventional web-spidering techniques are also prone to falsely identifying illegitimate files as legitimate, and vice-versa, further limiting the viability of the whitelist.

SUMMARY

According to at least one embodiment, a computer-implemented method for creating or updating an approved-file database may comprise intercepting a first file, identifying a source domain associated with the first file, identifying a trusted-domain database, determining whether a database record for the source domain associated with the first file exists within the trusted-domain database, creating a hash value for the first file if a database record for the source domain associated with the first file exists within the trusted-domain database, and storing the hash value for the first file in a first approved-file database. Intercepting the first file may comprise intercepting the first file as it is transmitted from a first domain in response to an automated request or a request from a client terminal.

The hash value for the first file may comprise a representation of contents of the first file. In addition, creating a hash value for the first file may comprise creating, using a secure-hash algorithm, a secure-hash value for the first file. The first file may comprise at least one of an executable file, an archive file, and an installation package.

The method may also further comprise creating a report of all intercepted files, with the report comprising a file name for each of the plurality of intercepted files, popularity information detailing the number of times each file was intercepted, or the source domain for each of the plurality of intercepted files. The method may also comprise granting access to the report or transmitting the report.

In certain embodiments, the method may comprise identifying a second approved-file database containing a plurality of hash values for a plurality of files and creating an aggregated approved-file database by aggregating hash values stored in the first approved-file database with hash values stored in the second approved-file database. In addition, the method may comprise receiving a request to access the first approved-file database, authenticating the request to access the first approved-file database, and granting access to the first approved-file database.

Identifying the source domain associated with the first file may comprise extracting domain information from an HTTP request issued by a client computing device to retrieve the first file, performing a reverse-domain lookup operation using an IP address for the server that hosts the first file, requesting source-domain information from a trusted third party server, or parsing the first file to locate embedded source-domain/publisher information. The method may also further comprise creating a local copy of the approved-file database and periodically synchronizing the local copy with the approved-file database. In addition, the method may further comprise determining, prior to storing the hash value for the first file, whether a previously created hash value for the first file exists within the approved-file database.

In certain embodiments, a method for verifying the legitimacy of a file may comprise receiving a first request from a first computing device to verify the legitimacy of a first file, determining whether a database record for a hash value for the first file exists within an approved-file database, and transmitting a response to the first computing device indicating that the first file is legitimate if a database record for the hash value for the first file exists within the approved-file database. The method may also further comprise transmitting a response to the first computing device indicating that the first file is not legitimate if a database record for the hash value for the first file does not exist within the approved-file database.

In at least one embodiment, a method for verifying the legitimacy of a file may comprise intercepting a first file, creating a hash value for the first file, accessing an approved-file database, determining whether a database record for the hash value for the first file exists within the approved-file database, and permitting access to the first file if a database record for the hash value for the first file exists within the approved-file database. The method may also comprise denying access to the first file if a database record for the hash value for the first file does not exist within the approved-file database. In certain embodiments, denying access to the first file may comprise blocking the first file, quarantining the first file, or deleting the first file. In addition, accessing the approved-file database may comprise authenticating a request to access the approved-file database.

In certain embodiments, method may further comprise creating, prior to storing the hash values in the approved-file database, a hash-value cache, identifying, from within the hash-value cache, at least one unique hash value, and determining whether a database record for the unique hash value for the first file exists within the approved-file database.

In at least one embodiment, a method for creating or updating a trusted-domain database may comprise evaluating a plurality of files from a first source domain, determining whether the plurality of files evaluated from the first source domain are legitimate, creating a database record for the first source domain if the plurality of files evaluated from the first source domain are legitimate, and storing the database record for the first source domain in a trusted-domain database. In certain embodiments, evaluating the plurality of files from the first source domain may comprise evaluating the plurality of files from the first source domain over a first period of time. Similarly, determining whether the plurality of files evaluated from the first source domain are legitimate may comprise determining whether the plurality of files evaluated from the first source domain over the first period of time are legitimate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of an exemplary computing system capable of implementing one or more of the embodiments described and/or illustrated herein.

DETAILED DESCRIPTION OF EXEMPLARY EMBODIMENTS

Figure 1A:
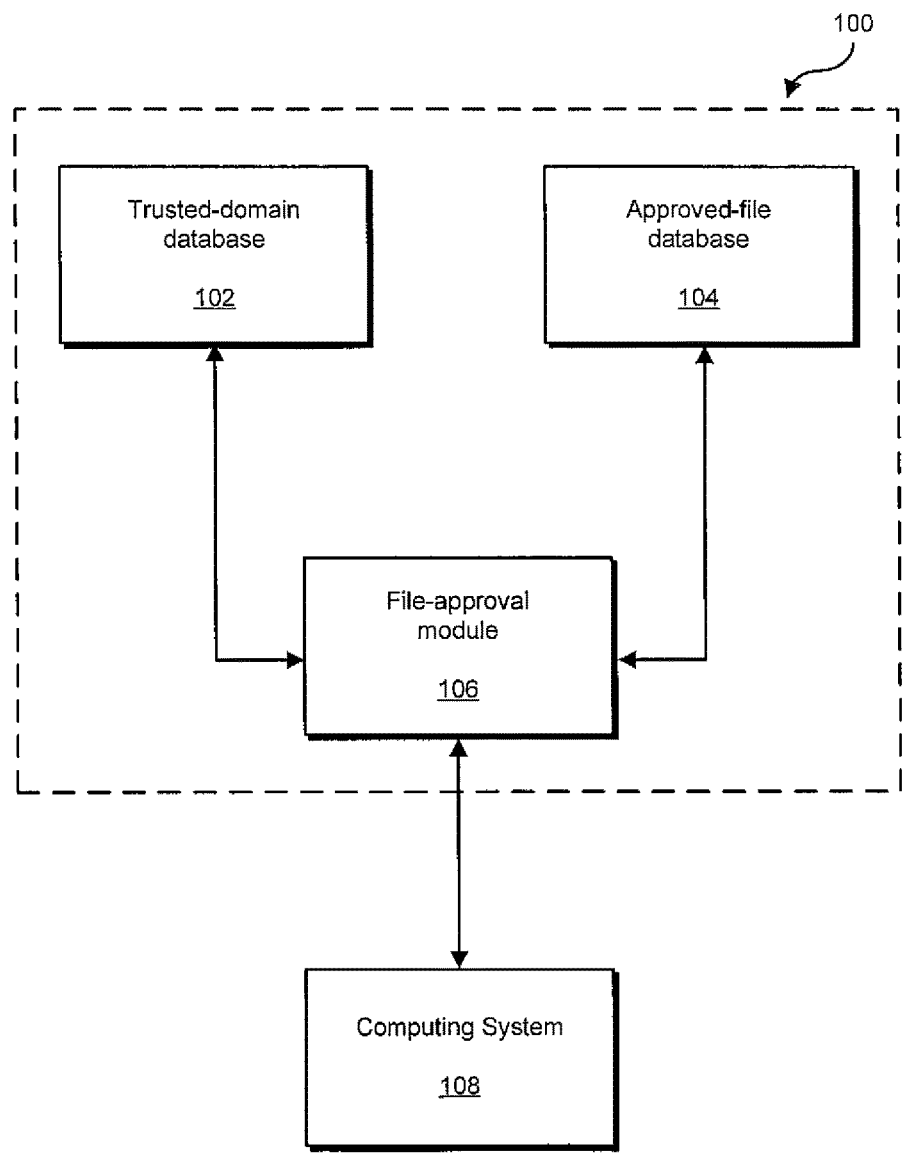
FIG. 1A is a block diagram of an exemplary system for creating or updating approved-file and trusted-domain databases and/or verifying the legitimacy of files according to at least one embodiment.

FIG. 1A is a block diagram of an exemplary system 100 for creating or updating approved-file and trusted-domain databases and/or verifying the legitimacy of files according to at least one embodiment. As illustrated in this figure, in at least one embodiment exemplary system 100 may comprise a trusted-domain database 102, an approved-file database 104, and a file-approval module 106. As will be explained in greater detail below in connection with FIGS. 2-9, system 100 may accomplish, and/or be a means for accomplishing, either alone or in combination with other elements, one or more of the exemplary embodiments described herein.

Trusted-domain database 102 generally represents any type or form of computing device or database capable of storing one or more database records. In at least one embodiment, and as will be explained in greater detail below, trusted-domain database 102 may comprise a database record for each of a plurality of trusted domains. Examples of trusted-domain database 102 include, without limitation, a database, a server, a local storage device, a remote storage device, or any other suitable computing device.

Approved-file database 104 generally represents any type or form of computing device or database capable of storing data. In at least one embodiment, and as will be explained in greater detail below, approved-file database 104 may comprise data or database records regarding one or more files. Examples of approved-file database 104 include, without limitation, a server, a database, a remote storage device, or any other suitable computing device.

File-approval module 106 generally represents any type or form of module or device capable of verifying, either alone or in combination with other components, the legitimacy of a file. In certain embodiments, file-approval module 106 may represent a software application or program that, when executed by a computing device, may cause the computing device to perform one or more tasks to verify the legitimacy of a file. For example, file-approval module 106 may represent a software module configured to run on a proxy server, a firewall, an enterprise server, a client terminal, a local internet-service provider server, a backbone network server, or any other suitable computing device. File-approval module 106 may also represent a special-purpose computer configured to perform one or more tasks necessary to verify the legitimacy of a file.

As illustrated in FIG. 1A, file-approval module 106 may communicate with trusted-domain database 102 and/or approved-file database 104. As will be explained in greater detail below, file-approval module 106 may verify, by communicating with trusted-domain database 102 and/or approved-file database 104, the legitimacy of one or more files. File-approval module 106 may also, as explained in greater detail below, create or update database records within approved-file database 104 and trusted-domain database 102 or may request that database records within approved-file database 104 and trusted-domain database 102 be created and/or updated.

In certain embodiments, and as illustrated in FIG. 1A, a computing system 108 may be in communication with exemplary system 100. Computing system 108 broadly represents any single or multi-processor computing device or system capable of executing computer-readable instructions. Examples of computing system 108 include, without limitation, a plurality of computing devices in communication with system 100, one or more client terminals in a networked environment, a distributed computing system, one or more servers, or any other computing system or device.

Figure 1B:
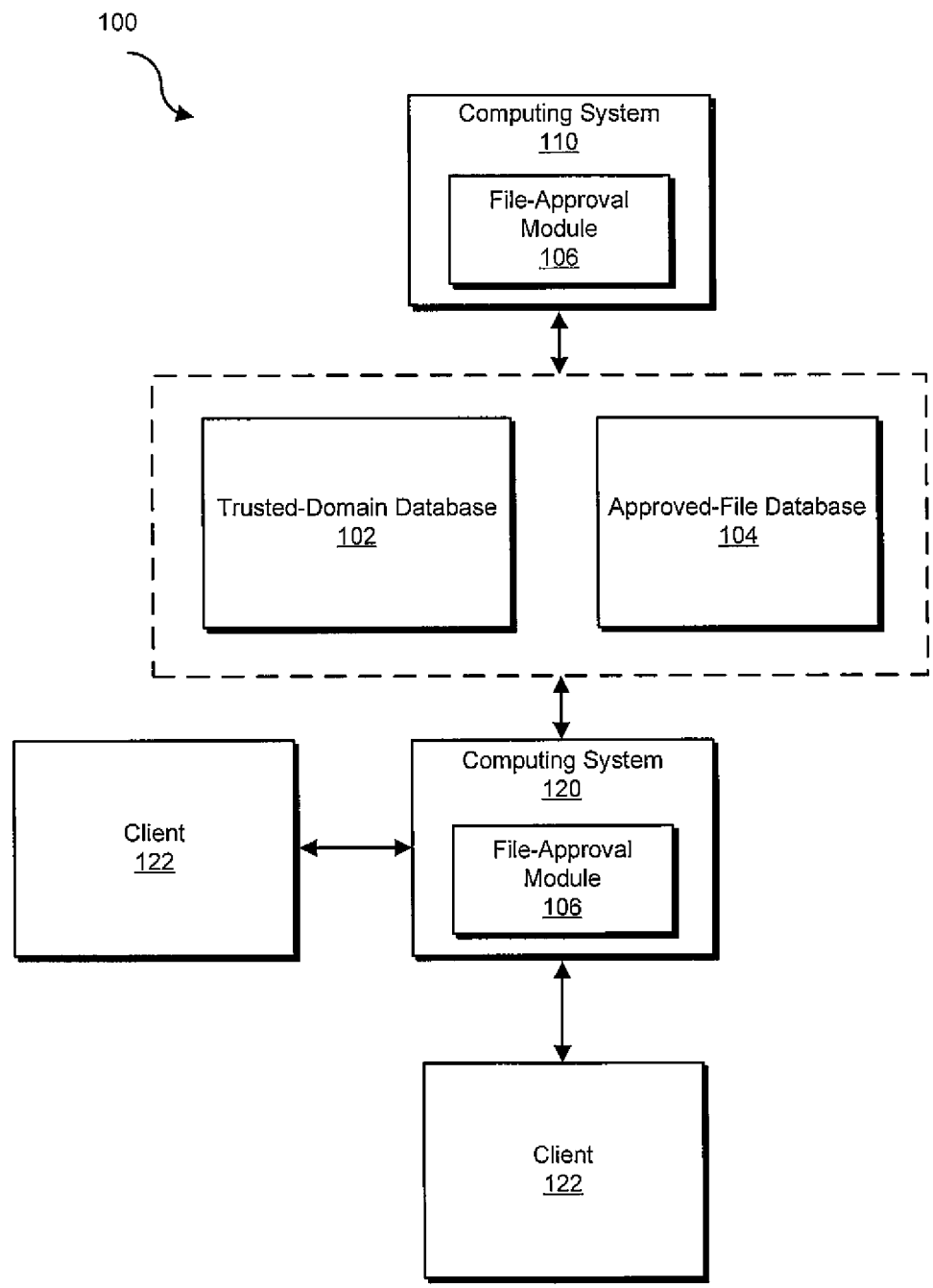
FIG. 1B is a block diagram of an exemplary system for creating or updating approved-file and trusted-domain databases and/or verifying the legitimacy of files according to an additional embodiment.

In certain embodiments, file-approval module 106 may be deployed and configured to run within a networked environment. For example, as illustrated in FIG. 1B, file-approval module 106 may be stored and configured to run on a computing system 120, which may, in certain embodiments, represent a proxy server in an enterprise network environment. In this embodiment, computing system 120 may service the requests of one or more clients 122 by forwarding requests from clients 122 to other servers. Accordingly, file-module 106 may, by intercepting the requests from clients 122, verify the legitimacy of a file requested from other servers by clients 122 before allowing clients 122 to access the file, as will be explained in greater detail below.

File-approval module 106 may also be stored and configured to run on a single computing system, such as computing system 110 in FIG. 1B. In at least one example, computing system 110 may represent a client terminal that is controlled, at least in part, by file-approval module 106. For example, and as will be discussed in greater detail below, file-approval module 106 may prevent computing system 110 from accessing files that have not been verified and approved by file-approval module 106.

Figure 2:
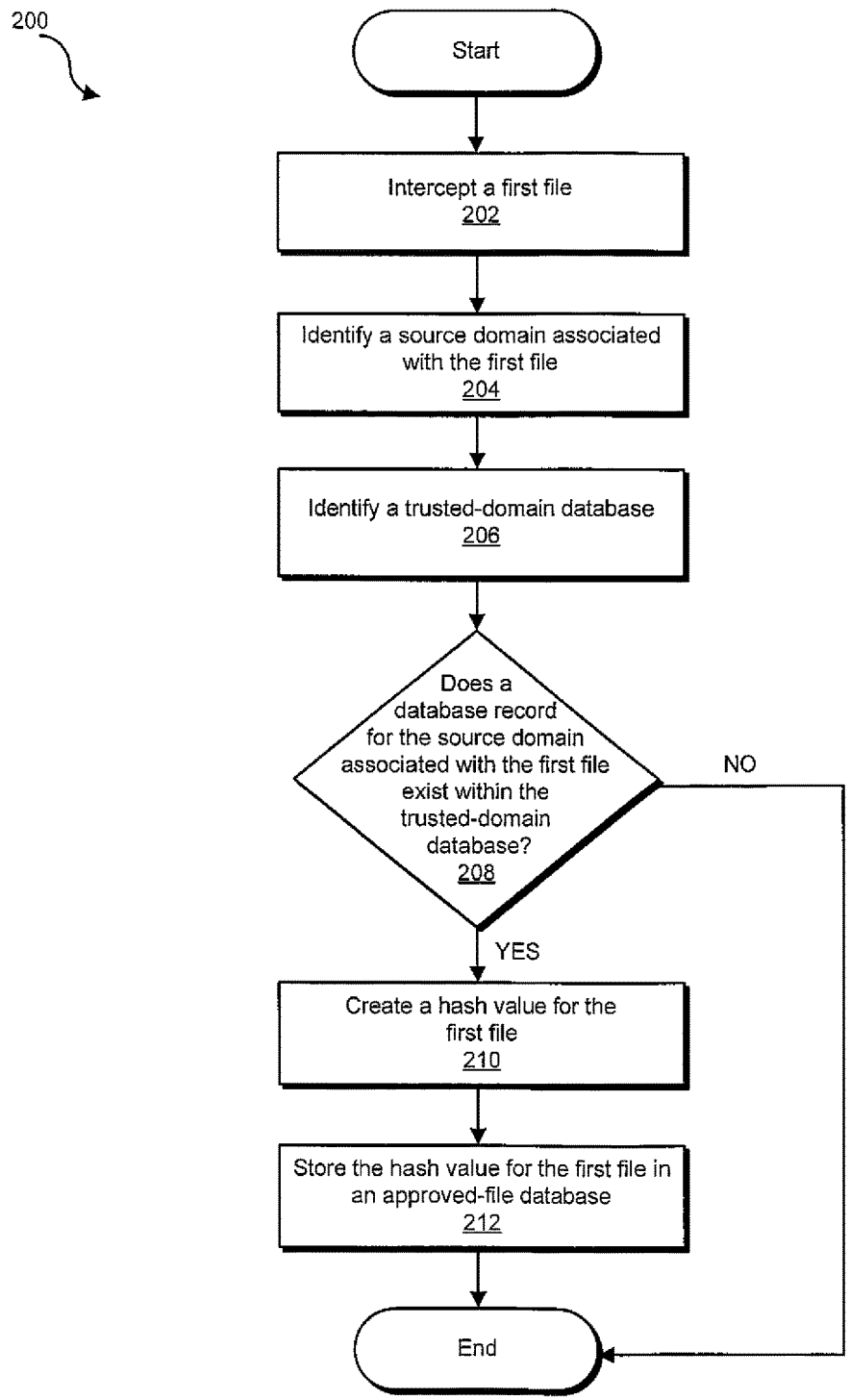
FIG. 2 is a flow diagram of an exemplary computer-implemented method for creating or updating an approved-file database according to at least one embodiment.

FIG. 2 is a flow diagram of an exemplary computer-implemented method 200 for creating or updating an approved-file database. As illustrated in this figure, at step 202 a first file may be intercepted. The first file intercepted in step 202 generally represents any type or form of computing data or file. Examples of this first file include, without limitation, an executable file (such as an .EXE file), an archive file (such as RPM), and an installation package (such as MSI).

A file may be intercepted in any number of ways. For example, intercepting the first file may comprise intercepting a file as it is transmitted from a web server from a specific domain, such as www.msn.com, in response to a request, such as a request from a client terminal or an automated request, or intercepting a file in an e-mail. For example, as illustrated in FIG. 1B, file-approval module 106 may be stored and configured to run on a computing system 120, which may, in certain embodiments, represent a proxy server in an enterprise network environment. In this embodiment, computing system 120 may proxy the requests of clients 122 by forwarding these requests to other servers, such as web servers. Accordingly, in this embodiment, intercepting a first file may comprise intercepting files transmitted by these other servers in response to requests from clients 122.

At step 204, a source domain and relative path associated with the first file may be identified. The phrase "source domain," as used herein, generally refers to the domain of origination of a file. For example, a source domain for a file that originates from MICROSOFT may be www.microsoft.com, while the source domain for a file that originates from ADOBE may be www.adobe.com. The source domain associated with the first file in step 202 may be identified in any number of ways. For example, the source domain associated with the first file may be identified by examining the client request for the first file (which may contain the source domain from which the first file may be retrieved), performing a reverse-domain-lookup operation, requesting source-domain information from a trusted third-party server, such as AKAMAI, or parsing the first file to identify source-domain information stored within the first file. In addition, some source domains may host files for multiple software publishers, wherein the software publishers may produce trusted and un-trusted software. For example, a source domain may have the domain name download.net, which hosts files from both trusted and un-trusted software publishers. The source domain may use a relative path to distinguish files posted by different publishers. For example, http://download.net/trusted/foo.exe, http://download.net/trusted/bar.exe, http://download.net/unknown/spyware1.exe, and http://download.net/unknown/spyware2.exe may represent possible paths for files hosted by a source domain. Download.net may host trusted files under the relative path "trusted." However, the domain download.net may also contain un-trusted files represented by the relative path "unknown." In this example, the analysis of files by source domain may be inadequate. Computing system 120 may need to further identify a prefix portion of the path where the file is hosted. Computing system 120 may associate one or more path-prefixes with an ambiguous publisher and distinguish the subset of files that are published on a site by good publishers from those published on a site by un-trusted publishers. For example, computing system 120 may associate the relative paths "/trusted," "/trusted1," and "/trusted2" with the "download.net" source domain.

At step 206, a trusted-domain database (such as trusted-domain database 102 in FIG. 1A) may be identified. As detailed above, the trusted-domain database identified in step 206 may comprise a database record for each of a plurality of trusted domains. In certain embodiments, the phrase "trusted domains" (database records for which may be stored in trusted-domain database 102) broadly refers to source domains that have been previously identified as "trusted," that is, source domains that have been previously verified to provide non-malicious content and files. In addition, some trusted domains may have one or more additional relative path specifications to identify subsets of their URL-space which are trusted and/or un-trusted. As will be explained in greater detail below, in order to be identified as "trusted," a source domain may have to satisfy certain criteria, such as having a history of not distributing malicious software (such as malware, viruses, spyware, adware, etc.) and/or not distributing unknown third party software and content from their own proprietary domain. Examples of trusted domains may include, without limitation, major or popular company domains (such as, for example, www.microsoft.com or www.adobe.com), domains for vendors of specialized software (e.g., tools for managing databases, text editors, registry cleanup tools, etc.), domains for trusted regional vendors of software, or domains for software vendors that have entered into an agreement to only supply non-malicious content and files.

At step 208, the system may determine whether a database record for the source domain associated with the first file identified in step 202 exists within the trusted-domain database. If a database record for the source domain associated with the first file exists within the domain database, which may indicate that the source domain is a "trusted" domain, then at step 210 a hash value for the first file may be created. However, if a database record for the source domain associated with the first file does not exist within the trusted-domain database, then the process flow of exemplary method 200 may terminate.

The phrase "hash value," as used herein, generally refers to data generated by performing a hash function on a file. In certain embodiments, the hash value of a file comprises a representation or digital "fingerprint" of the contents of the file. This hash value may be created in a variety of ways. For example, a hash value for the first file identified in step 202 may be created using a secure-hash algorithm, such as SHA-1, SHA-2, MD5, or any other secure-hash algorithm. At step 210, the hash value for the first file may be stored in an approved-file database, such as approved-file database 104 in FIG. 1A. After step 212, the process flow of exemplary method 200 may terminate.

Although not illustrated, exemplary method 200 may further comprise intercepting additional files, such as files downloaded from the web or received by e-mail, identifying source domains associated with the additional files, determining whether database records for the source domains associated with the additional files exist within the trusted-domain database, and, if database records for the source domains associated with the additional files exist within the trusted-domain database, creating and storing hash values for the additional files in the approved-file database.

In certain embodiments, a report containing information regarding each intercepted file may be created. This report may contain information regarding the name of each intercepted file, the source domain for each intercepted file, and/or how many times each file was intercepted. This report may be stored in a database, such as approved-file database 104 in FIG. 1B, transmitted to a computing device (such as a company's server), or provided to an entity (such as a corporation). This report may provide users of exemplary system 100 (such as corporations or organizations) with invaluable information regarding the file usage within their organization.

For the sake of clarity, and by way of example only, the following detailed description will provide an illustration of how exemplary method 200 may be implemented. A user of a client terminal, such as client 122 in FIG. 1B, may decide to download a file from a web server on the Internet. In this example, a user may be required to fill out a variety of forms and/or provide an electronic payment for the file prior to being able to download the file. After completing each of these requirements, the web server may, in response to the user's request, transmit the file to client 122. Computing system 120, acting as a proxy server, may then intercept the file before it reaches client 122.

File-approval module 106 may then identify the source domain and relative URL path within the source domain associated with the intercepted file using one of the techniques detailed above. For example, file-approval module 106 may extract the source domain and relative path of the file from the network request packets sent by the client. Once the source domain information and relative path for the file has been identified, file-approval module 106 may query approved-file database 104 to determine whether a database record for the source domain, and optionally the relative path, associated with the file exists within trusted-domain database 102. If a database record for the source domain, and optionally the relative path, associated with the file exists within the trusted-domain database, a hash value for the first file may be created and stored in the approved-file database 104.

In certain embodiments, the hash values stored in one approved-file database may be aggregated with hash values stored in additional approved-file database. Various authenticated clients may then access this aggregated approved-file database in order to verify the legitimacy of files. For example, a first party (such as a corporation) may enter into a partnership agreement with a second party to share the results within their respective approved-file databases, each of which may be created and/or updated using system 100 and/or exemplary method 200. Any number of additional parties may also join this partnership and agree to share the results within their respective approved-file databases, as desired. In this example, the database of legitimate files may grow exponentially as parties share and combine data generated from potentially millions of users.

In this example of shared or aggregated databases, exemplary method 200 may further comprise identifying a second approved-file database (which may contain a plurality of hash values for a plurality of files) and creating an aggregated approved-file database by aggregating hash values stored in the first approved-file database with hash values stored in the second approved-file database. The method may also comprise receiving a request to access the aggregated approved-file database, authenticating the request to access the aggregated approved-file database, and granting access to the aggregated approved-file database.

Figure 3:
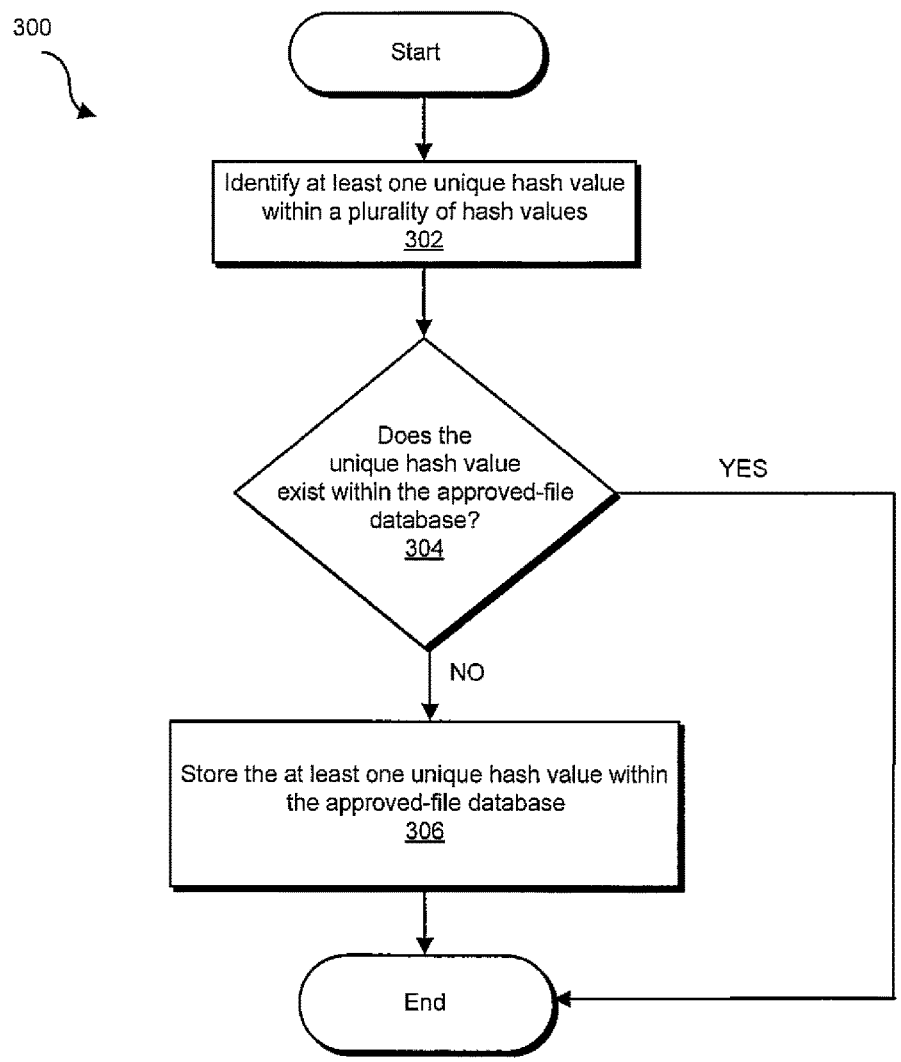
FIG. 3 is a flow diagram of an exemplary computer-implemented method for creating or updating an approved-file database according to an additional embodiment.

In certain embodiments, the system may determine, prior to storing the hash value for the first file, whether a previously created hash value for the first file exists within the first approved-file database. For example, FIG. 3 is a flow diagram of an exemplary computer-implemented method 300 for determining, prior to storing a hash value in an approved-file database, whether a previously created hash value for the file exists within the database. As illustrated in these figures, at step 302 the system may identify, from within a plurality of previously created hash values, at least one unique hash value prior to storing the previously created hash files in the approved-file database. At step 304, the system may determine whether the unique hash value identified in step 302 exists within the approved-file database. If the unique hash value identified in step 302 does not exist within the approved-file database, then at step 306 the system may store, within the approved-file database, the unique hash value.

Since, during normal usage, a single file, such as a file from a popular or frequently-visited domain, may be processed by system 100 on multiple occasions within short periods of time, exemplary method 300 may avoid transmitting and storing identical hash values on multiple occasions, thus promoting efficiency. Moreover, in certain embodiments, a local cache of hash values may be created prior to transmitting the hash values to the approved-file database. In this example, the system may identify and transmit only unique hash values from within this local cache to the approved-file database for storage. In an another example, once a system discovers and adds a file, the system may send additional statistics on file usage of known files with less frequency.

Figure 4:
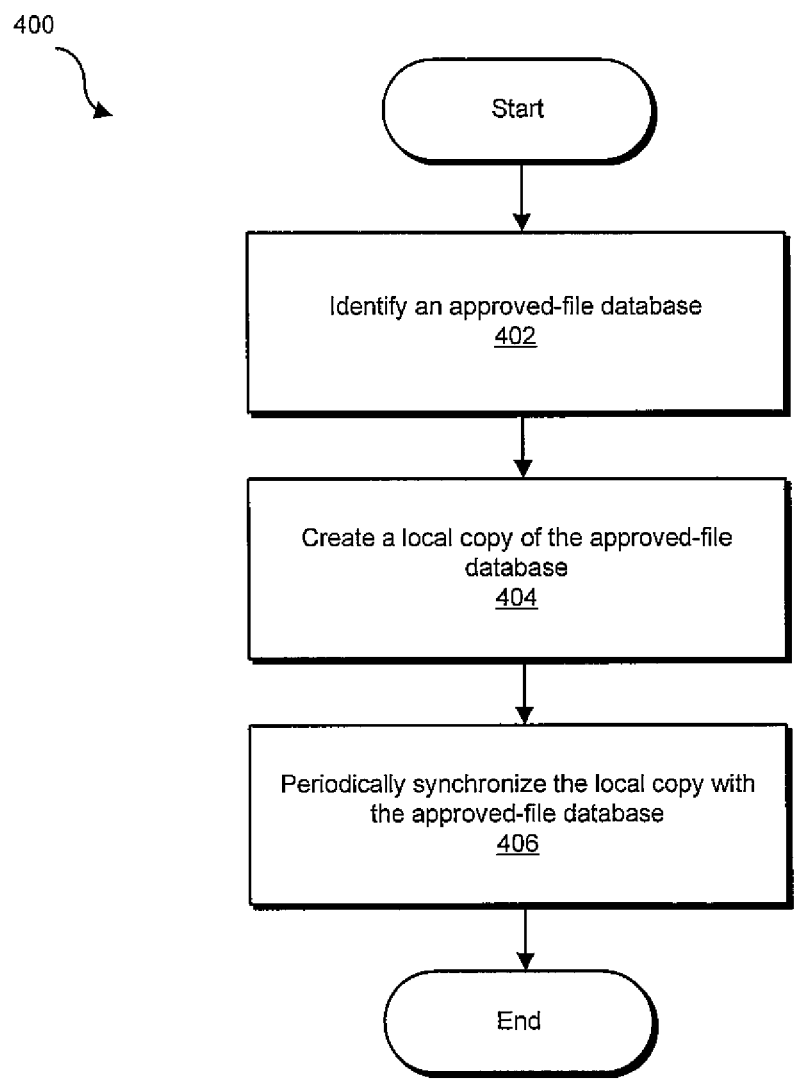
FIG. 4 is a flow diagram of an exemplary computer-implemented method for creating or updating an approved-file database according to an additional embodiment.

In certain embodiments, a network or sub-system may comprise a local copy of approved-file database 104 that may, from time-to-time, by synchronized with approved-file database 104. FIG. 4 is a flow diagram of an exemplary computer-implemented method 400 for creating a local copy of an approved-file database. As illustrated in this figure, at step 402 an approved-file database may be identified. At step 404, a local copy of the approved-file database may be created. In certain embodiments, creating a local copy of the approved-file database may comprise copying the contents of the approved-file database to a local or remote storage device. At step 406, the local copy of the approved-file database may be periodically synchronized with the approved-file database identified in step 402. The process flow of exemplary method 400 may then terminate.

Figure 5:
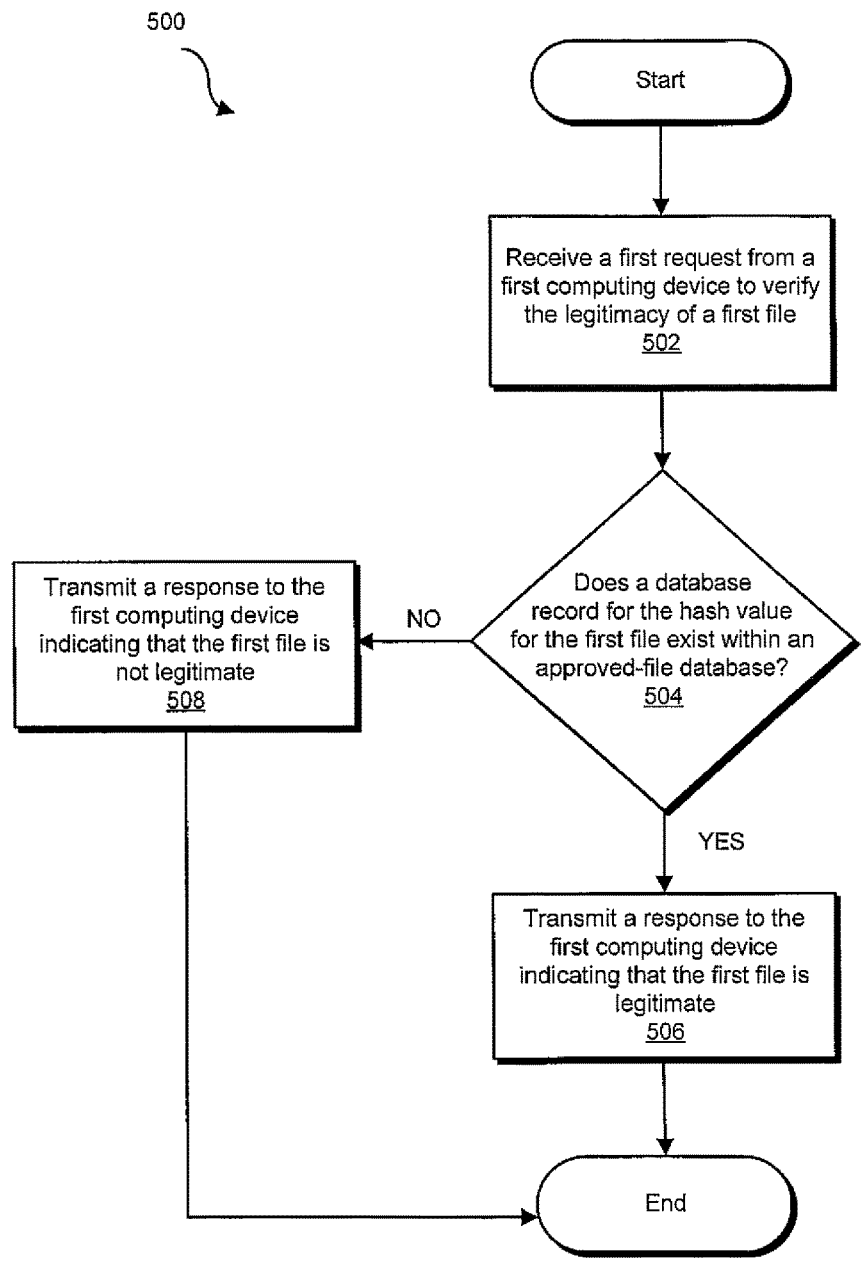
FIG. 5 is an illustration of an exemplary computer-implemented method for verifying the legitimacy of a file according to at least one embodiment.

In certain embodiments, approved-file database 104 may simply be used to verify the legitimacy of a file, apart from storing additional hash values or database records. For example, a proxy server may query a central approved-file database (such as approved-file database 104) to verify the legitimacy of files intercepted by the proxy servers. FIG. 5 is an illustration of an exemplary computer-implemented method 500 for verifying the legitimacy of a file. As illustrated in this figure, at step 502 a first request to verify the legitimacy of a first file may be received from a first computing device, such as computing device 108 in FIG. 1A or computing devices 110 and/or 120 in FIG. 1B. For example, computing device 120, which may represent a proxy server for clients 122, may, after intercepting a file transmitted to clients 122, may transmit a request to approved-file database 104 to verify the legitimacy of the intercepted file. In certain embodiments, the first request received in step 502 may comprise a hash value of the first file to be verified. This hash value may be created by a file-approval module (such as file-approval module 106 running on computing system 110 or computing system 120) or any other suitable device.

At step 504, the system may determine whether a database record for the hash value for the first file exists within an approved-file database, such as approved-file database 104 in FIG. 1A. In certain embodiments, this may be accomplished by querying approved-file database 104 to determine whether a hash value for an intercepted file exists within the database. If a database record for the hash value for the first file exists within the approved-file database, at step 506 a response to the first computing device indicating that the first file is legitimate may be transmitted to the first computing device. Alternatively, if a database record for the hash value for the first file does not exist within the approved-file database, then at step 508 a response to the first computing device indicating that the first file is not legitimate may be transmitted. The process flow of exemplary method 500 may then terminate.

Exemplary method 500 may enable a plurality of proxy servers to query a central approved-file database (such as approved-file database 104), or one or more cached copies of the central approved-file database, to verify the legitimacy of files intercepted by the proxy servers. Exemplary method 500 may also enable single computing devices, such as computing device 110 in FIG. 1B, to verify the legitimacy of a file prior to downloading the same.

Figure 6:
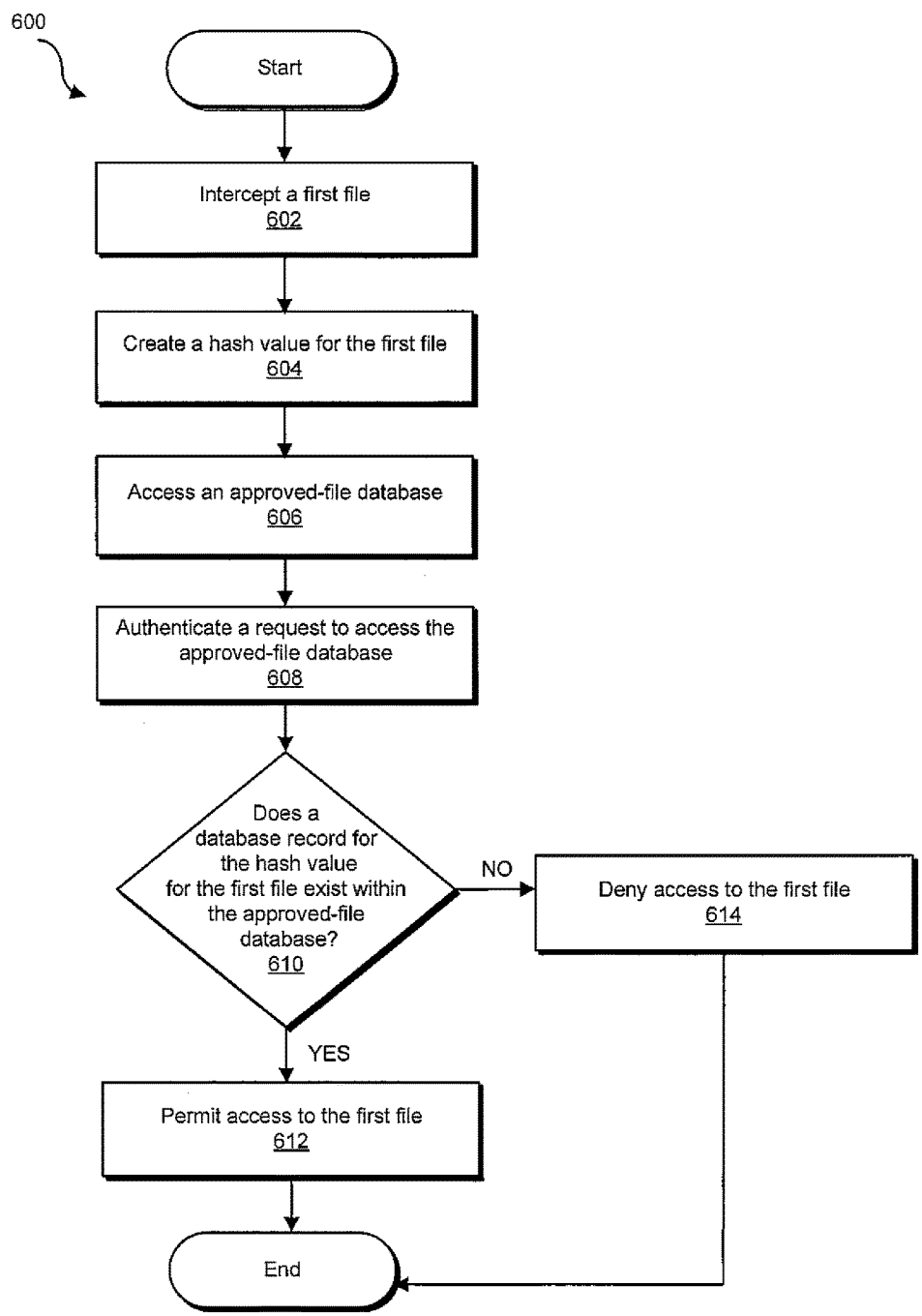
FIG. 6 is an illustration of an exemplary computer-implemented method for verifying the legitimacy of a file according to an additional embodiment.

FIG. 6 is an illustration of an exemplary computer-implemented method 600 for verifying the legitimacy of a file according to an additional embodiment. This figure details various steps or acts that may be performed by a computing device, such as a proxy server, when attempting to determine the legitimacy of a file. As illustrated in this figure, at step 602 a first file may be intercepted. As detailed above, this first file step may be intercepted by any computing device, such as proxy server in an enterprise network environment or an end-user personal computer within a corporation. At step 604, a hash value for the first file may be created. In certain embodiments, the hash value for the first file may be created by a file-approval module, such as file-approval module 106 in FIG. 1A, and/or a computing device, such as computing devices 108, 110, and 120 in FIGS. 1A-1B. At step 606, an approved-file database may be accessed. In certain embodiments, the approved-file database, such as approved-file database 104 in FIG. 1A, may be accessed by a computing system running a file-approval module (such as file-approval module 106 running on computing systems 110 and 120).

At step 608, a request to access the approved-file database may be authenticated. In certain embodiments, authenticating the request to access the approved-file database may comprise verifying that a computing device from which the request is received has been previously granted access rights to the approved-file database. For example, step 608 may comprise determining that proxy server, from which an access request has been received, has been granted access rights to the approved-file database.

At step 610, the system may determine whether a database record for the hash value for the first file exists within the approved-file database. If a database record for the hash value for the first file exists within the approved-file database, then at step 612 access to the first file may be permitted or granted. Alternatively, if a database record for the hash value for the first file does not exist within the approved-file database, then at step 614 access to the first file may be denied. Access to the first file may be denied or granted in any number of ways. For example, a proxy server may deny a client's access to the first file by preventing or blocking the first file from being downloading, quarantining the first file upon being downloading, deleting the first file, or sandboxing the first file. Alternatively, the system may request that the user fill out a form indicating the reason for downloading/installing an unapproved application, and may request rights to use such a file in violation of policy. Upon completing of step 614 and/or step 612, the process flow of exemplary method 600 may terminate.

As detailed above, a trusted-domain database may comprise a database record for each of a plurality of trusted domains. These trusted domains may be identified either manually or automatically by a computing system upon satisfying certain criteria. For example, to be trusted, a source domain may have to have a history of not distributing malicious software (such as malware, viruses, spyware, adware, etc.) and/or not distributing un-trusted third party software and content from their own proprietary domain.

Figure 7:
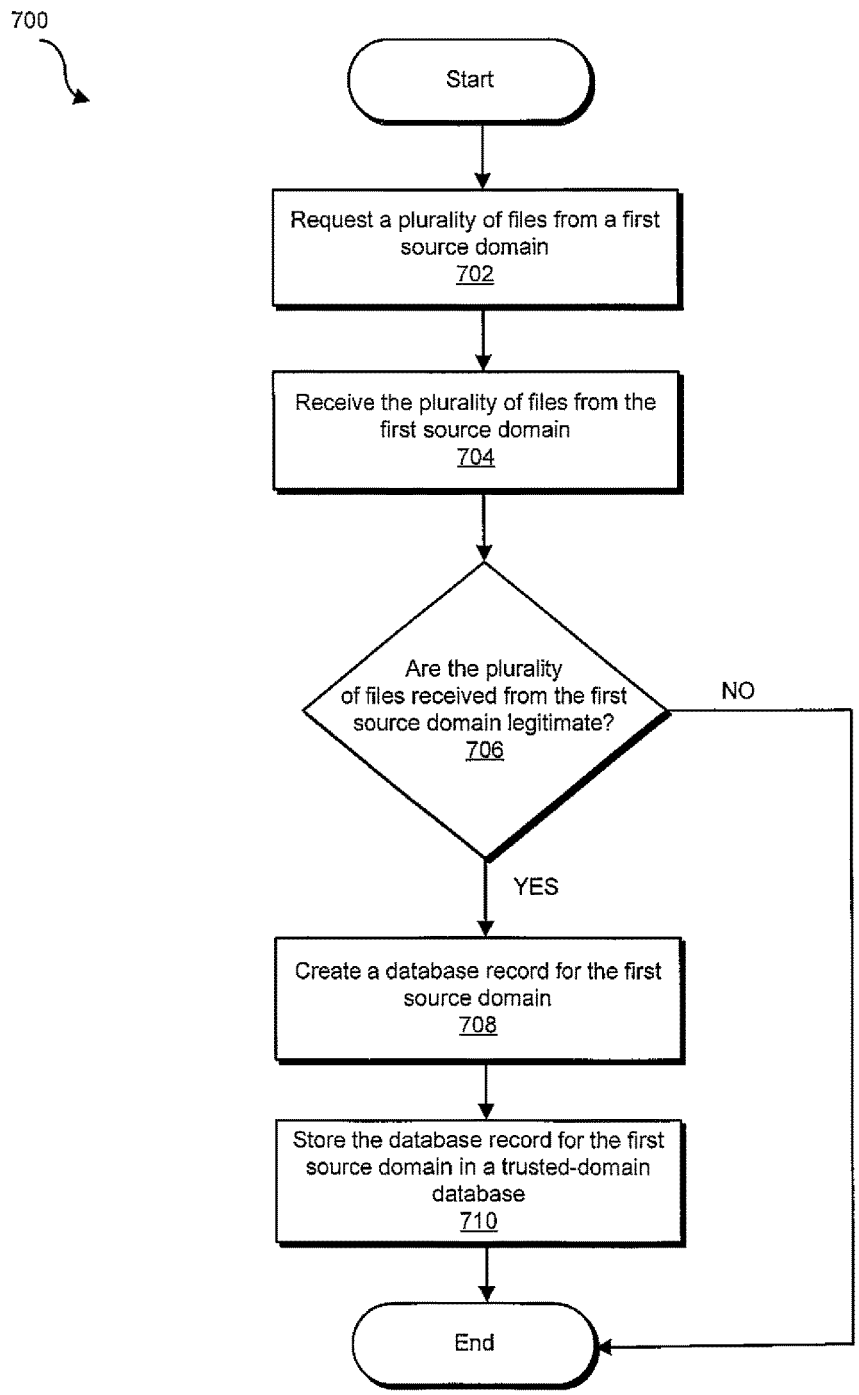
FIG. 7 is a flow diagram of an exemplary computer-implemented method for creating or updating a trusted-domain database.

FIG. 7 is a flow diagram of an exemplary computer-implemented method 700 for identifying trusted domains and creating or updating a trusted-domain database based on these trusted domains. As illustrated in this figure, at step 702 a plurality of files from a first source domain (e.g., www.microsoft.com) may be requested. In certain embodiments, one or more components of system 100 in FIG. 1A may evaluate the plurality of files from the first source domain. At step 704, the plurality of files from the first source domain may be received. At step 706, the system may determine whether the plurality of files from the first source domain are legitimate. The legitimacy of the files from the first source domain may be verified in any number of ways. For example, the system may determine whether the files received from the first source domain comprise instructions that, when executed by a computing system, cause the computing system to perform one or more undesirable acts.

If the plurality of files received from the first source domain are legitimate, at step 708 a database record for the first source domain may be created. At step 710, the database record for the first source domain may be stored in a trusted-domain database, such as trusted-domain database 102 in FIGS. 1A-1B. Alternatively, if one or more of the plurality of files received from the first source domain are not legitimate, then the process flow of exemplary method 700 may terminate.

Evaluating the plurality of files from the first source domain at step 704 may, in certain embodiments, comprise evaluating a plurality of files from the first source domain over a first period of time. Similarly, determining whether the plurality of files received from the first source domain are legitimate may comprise determining whether the plurality of files received from the first source domain over the first period of time are legitimate. For example, a system, such as system 100 in FIG. 1A, may monitor a plurality of files originating from a source domain over a fixed period of time. The system may then analyze each of the files originated from this source domain over the fixed period of time to determine whether any of the files are illegitimate. If one or more of the files originating from the source domain over the fixed period of time are illegitimate, then a database record for the source domain will not be created or stored in the trusted-domain database.

The exemplary embodiments disclosed herein provide a number of benefits over the prior art. For example, because approved-file database 104 automatically grows as potentially millions users of exemplary system 100 request and gain access to various files, the need for conventional web-spidering techniques, with their inherent limitations, is avoided. This database of legitimate files may also grow exponentially as the exemplary embodiments disclosed herein are employed in multiple network environments and approved-file results are aggregated and shared. Moreover, because legitimate files are automatically identified, much of the effort required in conventional, manual methods is eliminated.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Figure 8:
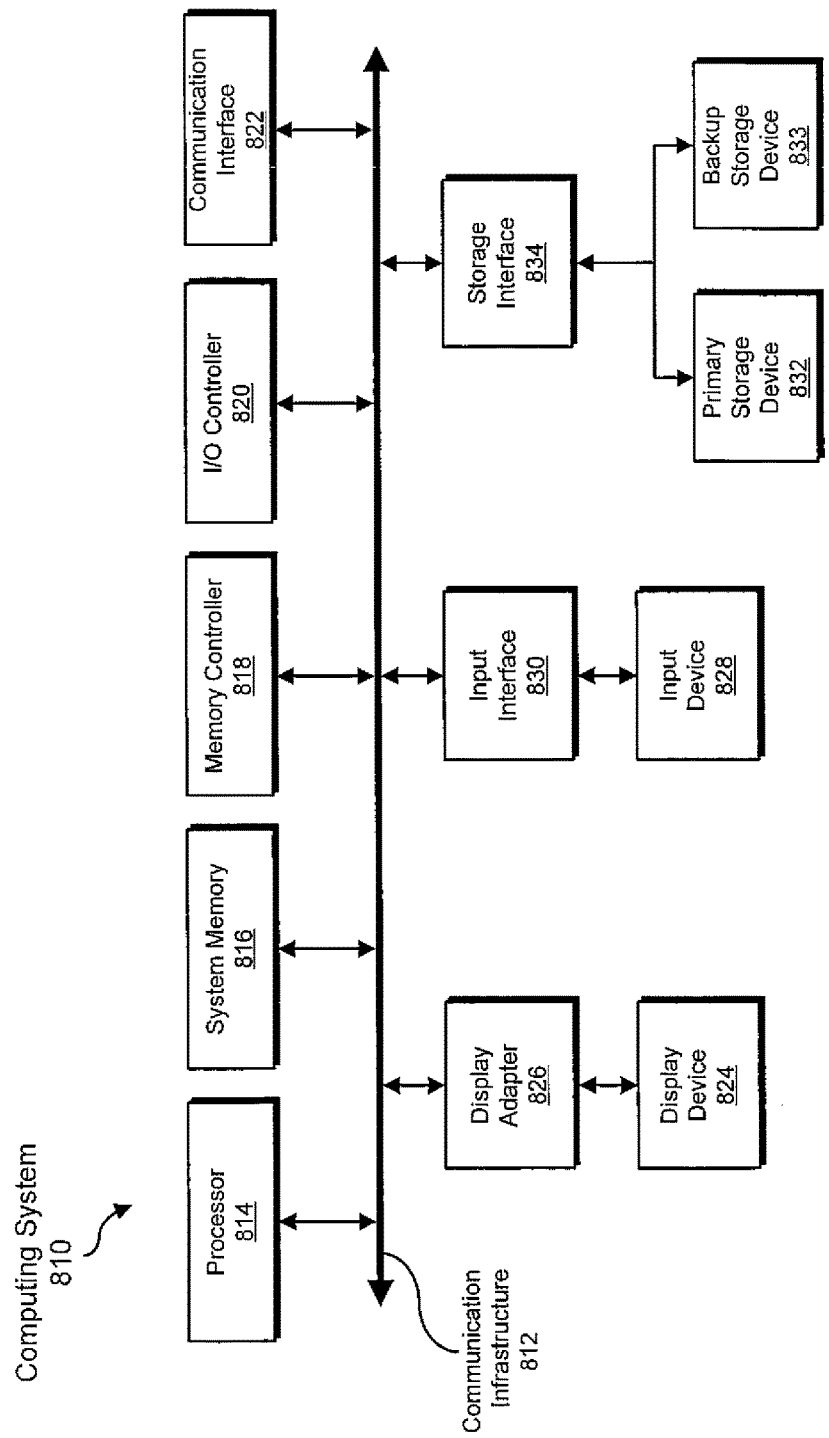

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the intercepting, identifying, determining, creating, storing, granting, transmitting, receiving, authenticating, performing, requesting, parsing, synchronizing, accessing, permitting, denying, blocking, quarantining, and deleting steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing device 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 818, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller may perform and/or be a means for performing, either alone or in combination with other elements, one or more of the steps or features described and/or illustrated herein, such as intercepting, identifying, determining, creating, storing, granting, transmitting, receiving, authenticating, performing, requesting, parsing, synchronizing, accessing, permitting, denying, blocking, quarantining, and deleting.

I/O controller 820 generally represents any type or form of module capable of coordinating and/or controlling the input and output functions of a computing device. For example, in certain embodiments I/O controller may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the intercepting, identifying, determining, creating, storing, granting, transmitting, receiving, authenticating, performing, requesting, parsing, synchronizing, accessing, permitting, denying, blocking, quarantining, and deleting steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the intercepting, identifying, determining, creating, storing, granting, transmitting, receiving, authenticating, performing, requesting, parsing, synchronizing, accessing, permitting, denying, blocking, quarantining, and deleting steps described herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the intercepting, identifying, determining, creating, storing, granting, transmitting, receiving, authenticating, performing, requesting, parsing, synchronizing, accessing, permitting, denying, blocking, quarantining, and deleting steps described herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems. Storage devices 832 and 833 may also be used, for example, to perform and/or be a means for performing, either alone or in combination with other elements, one or more of the intercepting, identifying, determining, creating, storing, granting, transmitting, receiving, authenticating, performing, requesting, parsing, synchronizing, accessing, permitting, denying, blocking, quarantining, and deleting steps described herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments descried and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include recordable media (such as floppy disks and CD- or DVD-ROMs), transmission-type media (such as carrier waves), electronic-storage media, magnetic-storage media, optical-storage media, and other distribution systems.

The computer-readable medium containing the computer program may then be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
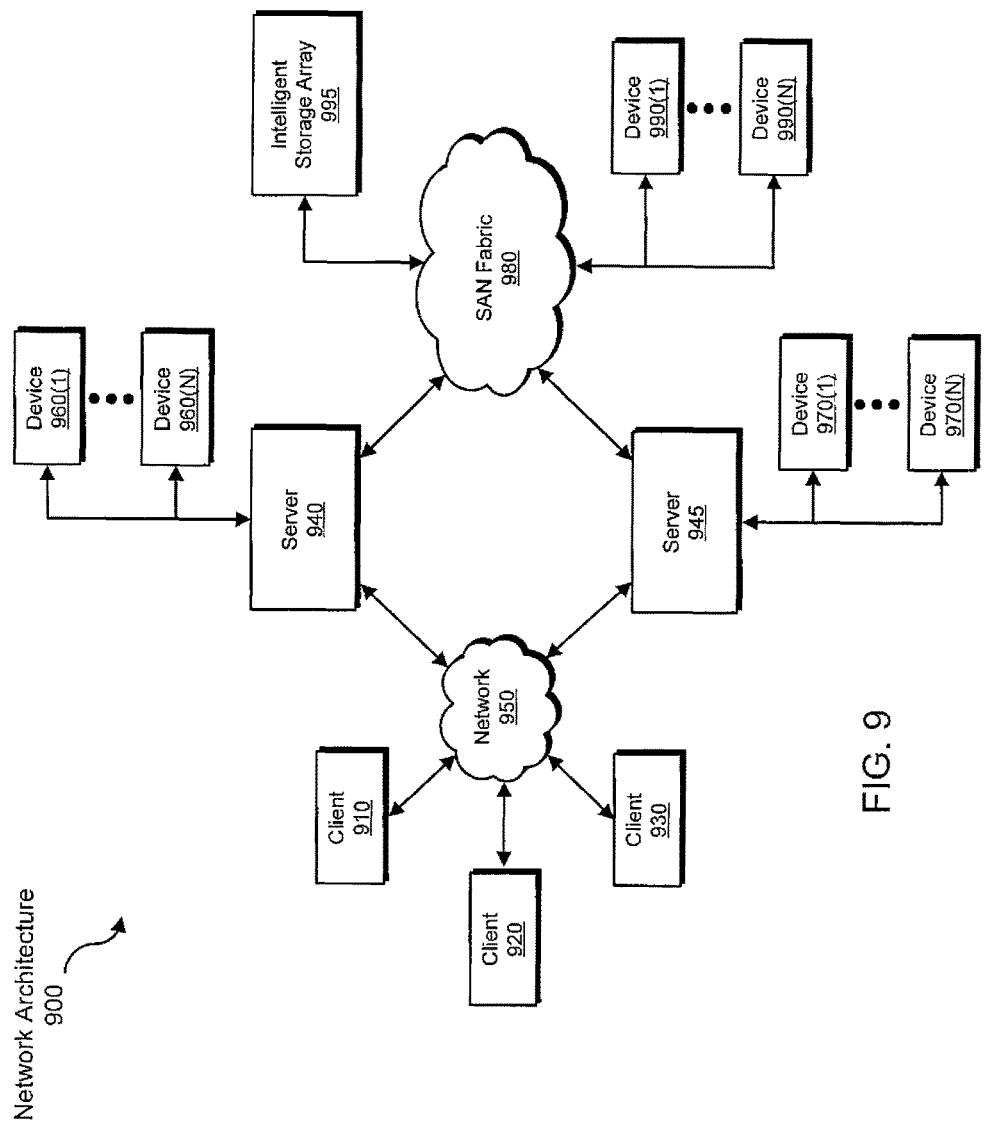
FIG. 9 is a block diagram of an exemplary computing system capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 990(1)-(N) may be directly attached to server 945. Storage devices 960(1)-(N) and storage devices 990(1)-(N) generally represent any type or form of storage device or medium capable of storing data and/or other computer-readable instructions. In certain embodiments, storage devices 960(1)-(N) and storage devices 990(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 950, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the intercepting, identifying, determining, creating, storing, granting, transmitting, receiving, authenticating, performing, requesting, parsing, synchronizing, accessing, permitting, denying, blocking, quarantining, and deleting steps described herein.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for automatically creating and updating file whitelists, the method comprising:
  identifying, at a proxy server, an attempt by at least one client computing device to download at least one file from at least one web server that requires that a user of the client computing device complete at least one task prior to downloading the file in a manner that prevents a file whitelisting system from accessing the file until the task is performed;
  after the user of the client computing device has completed the task required to download the file, intercepting the file at the proxy server as the file is transmitted from the web server to the client computing device;
  before allowing the client computing device to access the file:
    identifying, at the proxy server, a source domain from which the file originated;
    identifying, at the proxy server, a trusted-domain database that identifies trusted source domains for software vendors that have been verified as publishing trusted files;

determining, by causing the proxy server to query the trusted-domain database using the source domain, that the source domain associated with the file exists within the trusted-domain database as a trusted domain for a trusted software vendor;

based on determining that the source domain from which the file originated exists within the trusted-domain database, causing the proxy server to add the file to the file whitelist by:

creating a hash value for the file; and adding the hash value for the file to the file whitelist; and after determining that the source domain associated with the file exists within the trusted-domain database, allowing the client computing device to access the file by forwarding the file from the proxy server to the client computing device.

2. The method of claim 1, wherein intercepting the file comprises intercepting a plurality of files and the method further comprises creating a report of all intercepted files, the report comprising at least one of:

a file name for each of the plurality of intercepted files;

a category associated with each of the plurality of intercepted files;

popularity information detailing the number of times each of the plurality of files was intercepted; and a source domain for each of the plurality of intercepted files.

3. The method of claim 2, further comprising at least one of:

granting access to the report; and transmitting the report.

4. The method of claim 1, further comprising:

identifying an additional file whitelist maintained by an additional entity that identifies legitimate files, the additional file whitelist containing a hash value for each of a plurality of files; and creating an aggregated file whitelist by aggregating hash values contained in the file whitelist with the hash values contained in the additional file whitelist.

5. The method of claim 1, further comprising:

receiving a request to access the file whitelist;

authenticating the request to access the file whitelist; and granting access to the file whitelist.

6. The method of claim 1, wherein identifying, at the proxy server, the source domain from which the file originated comprises extracting the source domain from a hypertext transfer protocol request from the client computing device for the file.

7. The method of claim 1, wherein the proxy server:

proxies a client request from the client computing device for the file by forwarding the client request to the web server; and intercepts the file as the file is transmitted by the web server to the client computing device in response to the web server receiving the client request for the file forwarded from the proxy server.

8. The method of claim 1, wherein identifying, at the proxy server, the source domain from which the file originated comprises parsing the file to locate source domain information embedded within the file.

9. The method of claim 1, wherein the file comprises one of:

an executable file;

an archive file; and an installation package.

10. The method of claim 1, wherein identifying, at the proxy server, the source domain from which the file originated comprises performing a reverse-domain-lookup operation using an internet protocol address for a server that hosts the file.

11. The method of claim 1, further comprising querying, by the proxy server, an approved-file database to verify legitimacy of the file.

12. The method of claim 11, further comprising periodically synchronizing a local copy of the approved-file database.

13. The method of claim 1, wherein the proxy server is situated within an enterprise network environment.

14. The method of claim 1, wherein the trusted-domain database identifies domains for software vendors that have entered into an agreement to only supply non-malicious content and files.

15. The method of claim 1, wherein the hash value is created according to one of:

a SHA-1 secure-hash algorithm;

a SHA-2 secure-hash algorithm; and a MD5 secure-hash algorithm.

16. The method of claim 1, further comprising:

intercepting an additional file received by email; and adding a hash value for the additional file to the file whitelist based on a determination that a database record for a source domain from which the additional file originated exists within the trusted-domain database.

17. The method of claim 1, wherein the task that prevents the file whitelisting system from accessing the file until the task is performed comprises electronically paying for the file.

18. The method of claim 1, wherein the hash value for the file comprises a digital fingerprint of contents of the file.

19. The method of claim 1, wherein identifying the trusted-domain database comprises creating the trusted-domain database by:

evaluating a plurality of files from at least one domain;

determining that the plurality of files from the domain are legitimate; and in response to determining that the plurality of files from the domain are legitimate, adding the domain to the trusted-domain database as a trusted domain.

20. The method of claim 19, wherein:

evaluating the plurality of files from the domain comprises evaluating the plurality of files from the domain over a period of time; and determining that the plurality of files from the domain are legitimate comprises determining that the plurality of files from the domain evaluated over the period of time are legitimate.

* * * * *